US012711599B2

(12) United States Patent
Pallerla et al.

(10) Patent No.: US 12,711,599 B2
(45) Date of Patent: Aug. 18, 2026

(54) SCREEN DEFECT AND CONTAMINATION DETECTION FOR MOBILE DEVICES

(71) Applicant: QUALCOMM Incorporated, San Diego, CA (US)

(72) Inventors: Rakesh Pallerla, Hyderabad (IN); Naga Chandan Babu Gudivada, Hyderabad (IN); Prakash Tiwari, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 576 days.

(21) Appl. No.: 17/813,495

(22) Filed: Jul. 19, 2022

(65) Prior Publication Data

US 2024/0029227 A1 Jan. 25, 2024

(51) Int. Cl.
*G06T 7/00* (2017.01)
*G06F 3/0488* (2022.01)

(52) U.S. Cl.
CPC .......... *G06T 7/0004* (2013.01); *G06F 3/0488* (2013.01); *G06T 2207/30121* (2013.01)

(58) Field of Classification Search
CPC ......... G06T 7/0004; G06T 2207/30121; G06F 3/0488; G06F 2200/1633; G06F 1/1601; G06F 1/1637; G06F 1/1656; G06F 1/1652; G01N 2021/9513; G01N 21/94; G01N 21/95
See application file for complete search history.

(56) References Cited

U.S. PATENT DOCUMENTS 4,936,308 A * 6/1990 Fukukita ............. G01S 15/8977 600/549
7,298,876 B1 * 11/2007 Marshall ................ G16H 40/20 382/128
9,268,407 B1 * 2/2016 Noble ..................... G06F 3/005
10,572,749 B1 2/2020 Bonev et al.
10,574,803 B2 * 2/2020 Shim ................. H04M 1/72469
10,712,867 B2 * 7/2020 Li ......................... G06F 3/0412
10,771,902 B1 * 9/2020 Ryu ..................... H10N 30/206
10,928,331 B2 * 2/2021 Zhang ..................... G06T 7/001
(Continued)

FOREIGN PATENT DOCUMENTS

CN 113438340 A 9/2021
WO WO-2008140308 A1 * 11/2008 .......... H04M 1/0268

OTHER PUBLICATIONS

The method and system for controlling access of data item (Year: 2021).*
(Continued)

*Primary Examiner* — Solomon G Bezuayehu
(74) *Attorney, Agent, or Firm* — Muncy, Geissler, Olds & Lowe, P.C./ Qualcomm Incorporated

(57) ABSTRACT

Systems and methods for detecting and mitigating a contaminant on a display are disclosed. In an aspect, a mobile device may scan the display. The mobile device may generate one or more images related to the contaminant based on the scanning. The mobile device may detect the contaminant on the display based on the one or more images. The mobile device may identify the contaminant on the display using the one or more images. The mobile device may perform a mitigation action to mitigate the contaminant based on the identification of the contaminant.

29 Claims, 7 Drawing Sheets

(56) References Cited

U.S. PATENT DOCUMENTS

| | | | | |
|---|---|---|---|---|
| 11,320,939 | B1 * | 5/2022 | Knowles | G06F 3/0436 |
| 2003/0020008 | A1 * | 1/2003 | Iwamoto | G06F 3/0423 250/221 |
| 2009/0116021 | A1 * | 5/2009 | Bulson | G01N 21/94 356/445 |
| 2014/0055717 | A1 * | 2/2014 | Benson | G02B 6/0093 156/60 |
| 2014/0189563 | A1 | 7/2014 | Kim | |
| 2014/0191110 | A1 * | 7/2014 | Holenarsipur | G06F 3/0421 250/206 |
| 2015/0111616 | A1 * | 4/2015 | Kim | G06F 3/0484 455/566 |
| 2015/0249733 | A1 * | 9/2015 | Miura | G06F 3/0488 455/566 |
| 2016/0004376 | A1 * | 1/2016 | Mitsunaga | G06F 3/0488 345/173 |
| 2016/0093412 | A1 * | 3/2016 | Liao | A61L 2/10 250/221 |
| 2016/0266717 | A1 * | 9/2016 | Oral | G06F 3/04186 |
| 2016/0345931 | A1 * | 12/2016 | Xu | G01S 7/52038 |
| 2016/0379605 | A1 * | 12/2016 | Morobishi | G06F 3/147 345/174 |
| 2017/0090024 | A1 * | 3/2017 | Kitchens | G06V 10/12 |
| 2017/0131841 | A1 * | 5/2017 | Chang | G06F 3/0418 |
| 2017/0276587 | A1 * | 9/2017 | Dong | H04M 1/725 |
| 2018/0223127 | A1 * | 8/2018 | Cho | C08L 71/02 |
| 2018/0270422 | A1 * | 9/2018 | Akkala | G06V 10/52 |
| 2019/0070641 | A1 * | 3/2019 | Tu | B08B 5/02 |
| 2019/0094140 | A1 * | 3/2019 | Han | G01N 21/47 |
| 2019/0107490 | A1 * | 4/2019 | Schindler | G01N 21/6447 |
| 2019/0128821 | A1 | 5/2019 | Yang et al. | |
| 2019/0340455 | A1 * | 11/2019 | Jung | G06V 10/993 |
| 2020/0264756 | A1 | 8/2020 | Jin et al. | |
| 2020/0311380 | A1 | 10/2020 | Zhang et al. | |
| 2020/0341519 | A1 * | 10/2020 | O'Donnell | G06F 1/1637 |
| 2020/0375454 | A1 * | 12/2020 | Komurata | A61B 3/113 |
| 2021/0027438 | A1 * | 1/2021 | Yang | G06T 7/0002 |
| 2021/0192730 | A1 * | 6/2021 | Raciti | G06T 7/0012 |
| 2021/0229398 | A1 | 7/2021 | Cho et al. | |
| 2022/0075978 | A1 * | 3/2022 | Liu | G06V 40/1329 |
| 2022/0122243 | A1 | 4/2022 | Fitzgerald et al. | |
| 2022/0137782 | A1 * | 5/2022 | Seger, Jr. | G06F 3/0412 345/156 |
| 2022/0266317 | A1 * | 8/2022 | Karri | G09F 9/301 |
| 2022/0269800 | A1 * | 8/2022 | Cui | G06V 40/172 |
| 2022/0270342 | A1 * | 8/2022 | Shiozaki | G02B 27/0093 |
| 2023/0088921 | A1 * | 3/2023 | Borg | G06F 3/0416 345/173 |
| 2023/0105394 | A1 * | 4/2023 | Waymeyer | B08B 3/08 62/347 |
| 2023/0138418 | A1 * | 5/2023 | Harald | A61B 1/0125 600/109 |
| 2023/0414194 | A1 * | 12/2023 | Koshino | A61B 8/08 |
| 2024/0012502 | A1 * | 1/2024 | Niioka | G06F 3/0416 |
| 2024/0184504 | A1 * | 6/2024 | Gao | G06F 9/451 |

OTHER PUBLICATIONS

Smartphone glass inspection system (Year: 2021).*

Screen damage detection for devices (Year: 2017).*

International Search Report and Written Opinion—PCT/US2023/024968—ISA/EPO—Sep. 27, 2023.

* cited by examiner

100
Location Server
172
Core Network
170
mmW BS
180
UE
182
184
122
134
BS
102
UE
104
120
UE
164
110
192
UE
190
194
ST A
152
154
AP
150
SC
102'
110'
SV
112
124

SCREEN DEFECT AND CONTAMINATION DETECTION FOR MOBILE DEVICES

BACKGROUND OF THE DISCLOSURE

1. Field of the Disclosure

Aspects of the disclosure relate generally to contamination and scratch detections for mobile device screens.

2. Description of the Related Art

Contaminants such as dust/dirt particles and liquid on a display of a smart phone or a mobile device may scratch and damage the display especially rollable displays. However, currently, the smart phones are not able to distinguish between different types of contaminants such as dust particles, scratches, and liquid on a display. Smart phones may need to know what types of contaminants are on what parts of the display to address the problem. For example, an app on the smart phone may need to know what type of contaminant is on what part of the display to function properly such as a fingerprint reader. A scratch or contaminant on the display may lead to a false reading. Further, contaminants may cause damage to screens that are rollable, foldable, or otherwise would be subject to movement of the contaminant relative to the screen surface.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of mitigating a contaminant on a display includes scanning the display; generating one or more images related to the contaminant based on the scanning; detecting the contaminant on the display based on the one or more images; identifying the contaminant on the display using the one or more images; and performing a mitigation action to mitigate the contaminant based on the identification of the contaminant.

In an aspect, a mobile device includes an ultrasonic scanner; a memory; and at least one processor communicatively coupled to the memory and ultrasonic scanner and configured to mitigate a contaminant on a display, the at least one processor, memory and ultrasonic scanner cooperatively configured to: scan the display; generate one or more images related to the contaminant based on the scan; detect the contaminant on the display based on the one or more images; identify the contaminant on the display using the one or more images; and perform a mitigation action to mitigate the contaminant based on the identification of the contaminant.

In an aspect, a mobile device configured to mitigate a contaminant on a display includes means for scanning the display; means for generating one or more images related to the contaminant based on the scanning; means for detecting the contaminant on the display based on the one or more images; means for identifying the contaminant on the display using the one or more images; and means for performing a mitigation action to mitigate the contaminant based on the identification of the contaminant.

In an aspect, a non-transitory computer-readable medium storing computer-executable instructions configured to mitigate a contaminant on a display that, when executed by a mobile device, cause the mobile device to: scan the display; generate one or more images related to the contaminant based on the scanning; detect the contaminant on the display based on the one or more images; identify the contaminant on the display using the one or more images; and perform a mitigation action to mitigate the contaminant based on the identification of the contaminant.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of thereof.

DETAILED DESCRIPTION

Figure 1:
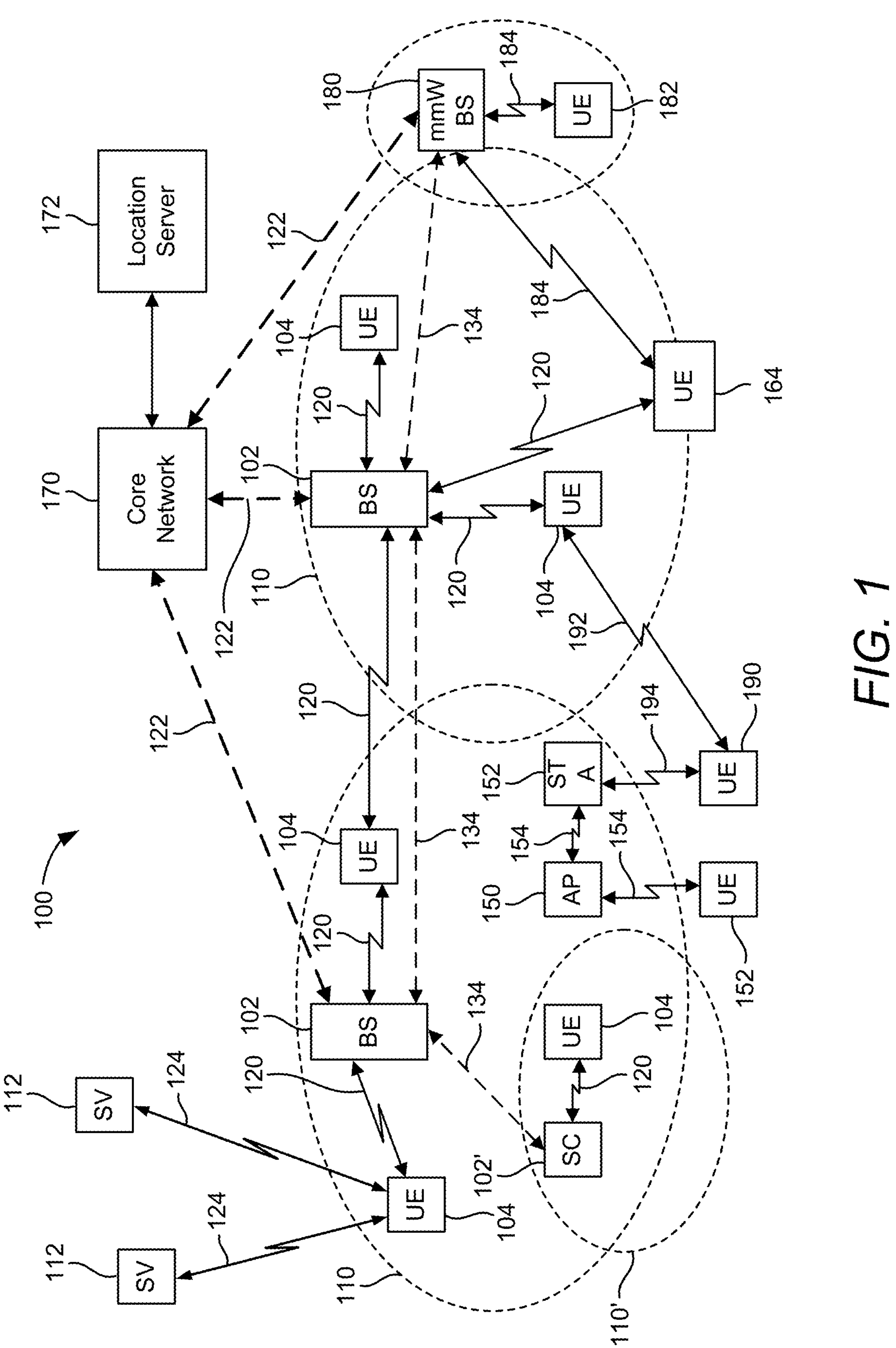
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words “exemplary” and/or “example” are used herein to mean “serving as an example, instance, or illustration.” Any aspect described herein as “exemplary” and/or “example” is not necessarily to be construed as preferred or advantageous over other aspects. Likewise, the term “aspects of the disclosure” does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). The base stations 102 may communicate with each other directly or indirectly (e.g., through the EPC/5GC) over backhaul links 134, which may be wired or wireless. The mmW base station 180 may communicate to the core network 170 through backhaul links 122 to provide support to UE 182 and UE 164 over wireless links 184. UE 164 may also communicate with base station 102 over wireless link 120

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. Additionally, a small cell (SC) base station 102' may have a geographic coverage area 110' that substantially overlaps with the geographic coverage area 110 of one or more macro cell base stations 102. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. As used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2:
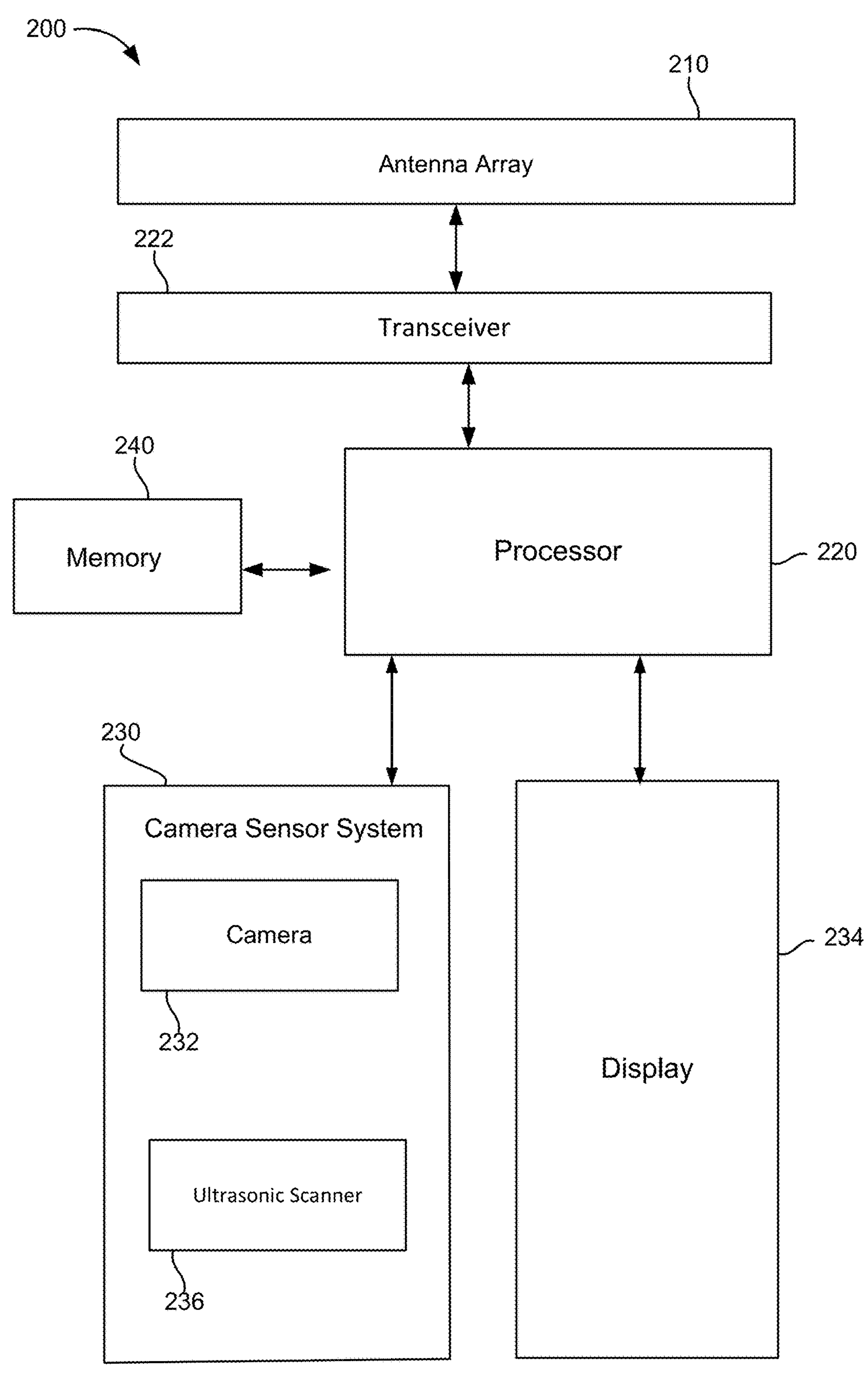
FIG. 2 illustrates an exemplary mobile device, according to aspects of the disclosure.

With reference to FIG. 2, a simplified schematic of an exemplary mobile device 200 with processor 220, antenna array 210, transceiver 222, camera sensor system 230 and display 234 is illustrated. In an aspect, mobile device 200 may employ ultrasonic full screen fingerprint scanner/sensor technology to detect fingerprints and other objects on display 234. Mobile device 200 further comprises memory 240. Camera sensor system 230 includes camera 232 and ultrasonic scanner 236, which transmits and receives ultrasonic pulses. Camera sensor system 230 may further include other sensors (not shown) such as one or more of a lidar sensor, a radar sensor, a velocity sensor and/or any other sensor that may aid in the operation of mobile device 200. It will be noted that mobile device 200 may be similar to UE 104, 190 or any other UEs shown in FIG. 1 and may further comprise one or more components as known to one skilled in the art, but which are not illustrated in FIG. 2.

Figure 4A:
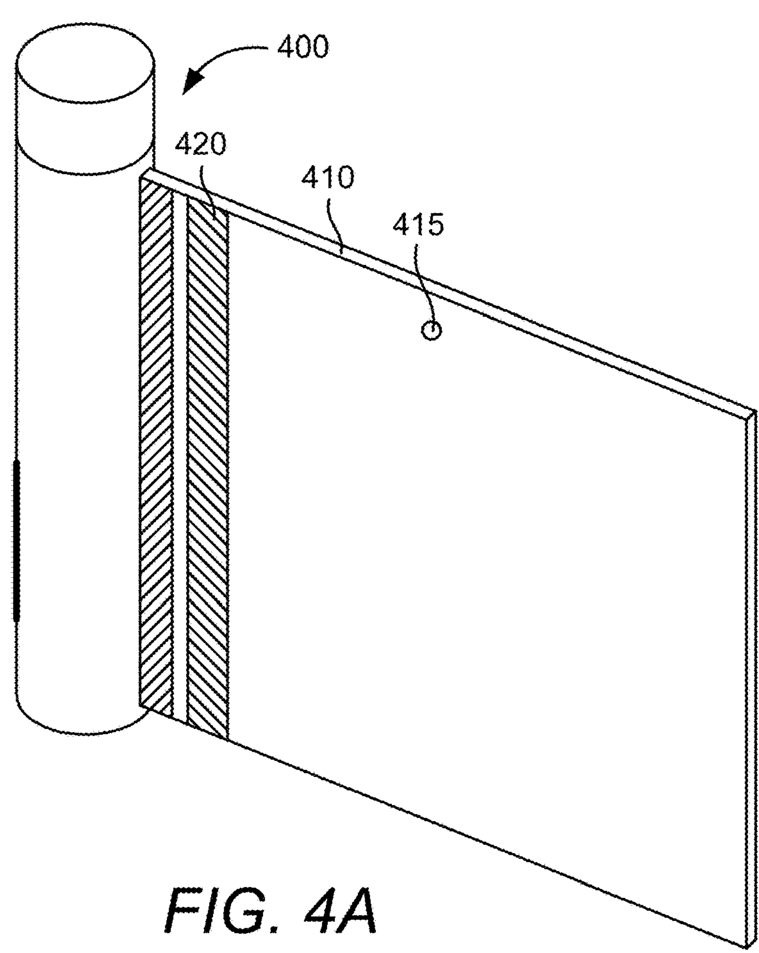
FIGS. 4A-4D illustrate example implementation of a mobile device remediating contaminants on a display of the mobile device according to various aspects of the disclosure.

Mobile device 200 may be any suitable electronic device that is mobile. For example, mobile device 200 may be a smartphone, a tablet, a laptop, a smartwatch, a shipment tracking device, a wearable, a smart glass, an onboard computer installed on a vehicle or the like. For example, in an aspect, display 234 may be a rollable display such as display 410 as shown in FIG. 4A. In another aspect, display 234 may be a flat non-rollable display. In yet another aspect, display 234 may be a foldable display. Further, it will be appreciated that although a mobile device 200 is used for illustrative purposes, the contaminant identification and mitigation aspects disclosed herein are not limited to mobile devices or the various example configurations illustrated. For example, disclosed aspects may be applied to any suitable display, such as, monitors, televisions, and the like.

Antenna array 210 includes multiple antennas for transmit and receive beamforming as explained above. Antenna array 210 is coupled to transceiver 222. Processor 220 may control antenna array 210 and transceiver 222.

Transceiver 222 may include a wireless wide area network (WWAN) transceiver providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. Transceiver 222 may further include a wireless local area network (WLAN) transceiver.

In addition, transceiver 222 may include satellite positioning systems (SPS) receivers. The SPS receivers may be connected to one or more antennas in antenna array 210, respectively, and may provide means for receiving and/or measuring SPS signals, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers may comprise any suitable hardware and/or software for receiving and processing SPS signals.

As shown in FIG. 2, processor 220 is coupled to transceiver 222. Processor 220 is also coupled to memory 240 and camera sensor system 230 as shown in FIG. 2. Camera sensor system 230 includes camera 232 and ultrasonic scanner 236. In an aspect, ultrasonic scanner 236 may transmit ultrasonic pulses to detect fingerprints and objects such as contaminants (both solid and liquid contaminants) that are on display 234. In an aspect, ultrasonic scanner 236 may include ultrasonic transmitter and receiver (not shown). Ultrasonic scanner 236 may transmit ultrasonic pulses against a finger or an object on display 234 and detect the pulses that are absorbed or bounced back to ultrasonic scanner 236. In an aspect, processor 220 may control the operation of camera sensor system 230 including ultrasonic scanner 236. In addition, processor 220 is coupled to display 234 and may display objects and renderings including virtual objects and renderings on display 234.

In various aspects, processor 220 may use ultrasonic scanner 236 to detect various contaminants on display 234 including liquid contaminants and solid contaminants. Ultrasonic scanner 236 may transmit ultrasonic pulses onto display 234 and receive the pulses reflected back to ultrasonic scanner 236 to detect the contaminants on display 234. In an aspect, processor 220 may direct ultrasonic scanner 236 to transmit ultrasonic pulses in various different frequencies and use various different range gate delays to detect the contaminants. Processor 220 may use multiple combinations of frequencies and range gate delays to create and generate multiple images of the contaminant. In other words, ultrasonic scanner 236 may change the frequency of the transmitted ultrasonic pulses to detect the contaminants and may change the range gate delays to provide timing offsets to aid in detecting the contaminants. In other aspects, the contaminants may be detected using embedded imaging sensors. For example, one or more captured images may be compared to a calibration image that may be established during initial testing of the device, such as a factory calibration procedure.

Figures 3A, 3B:
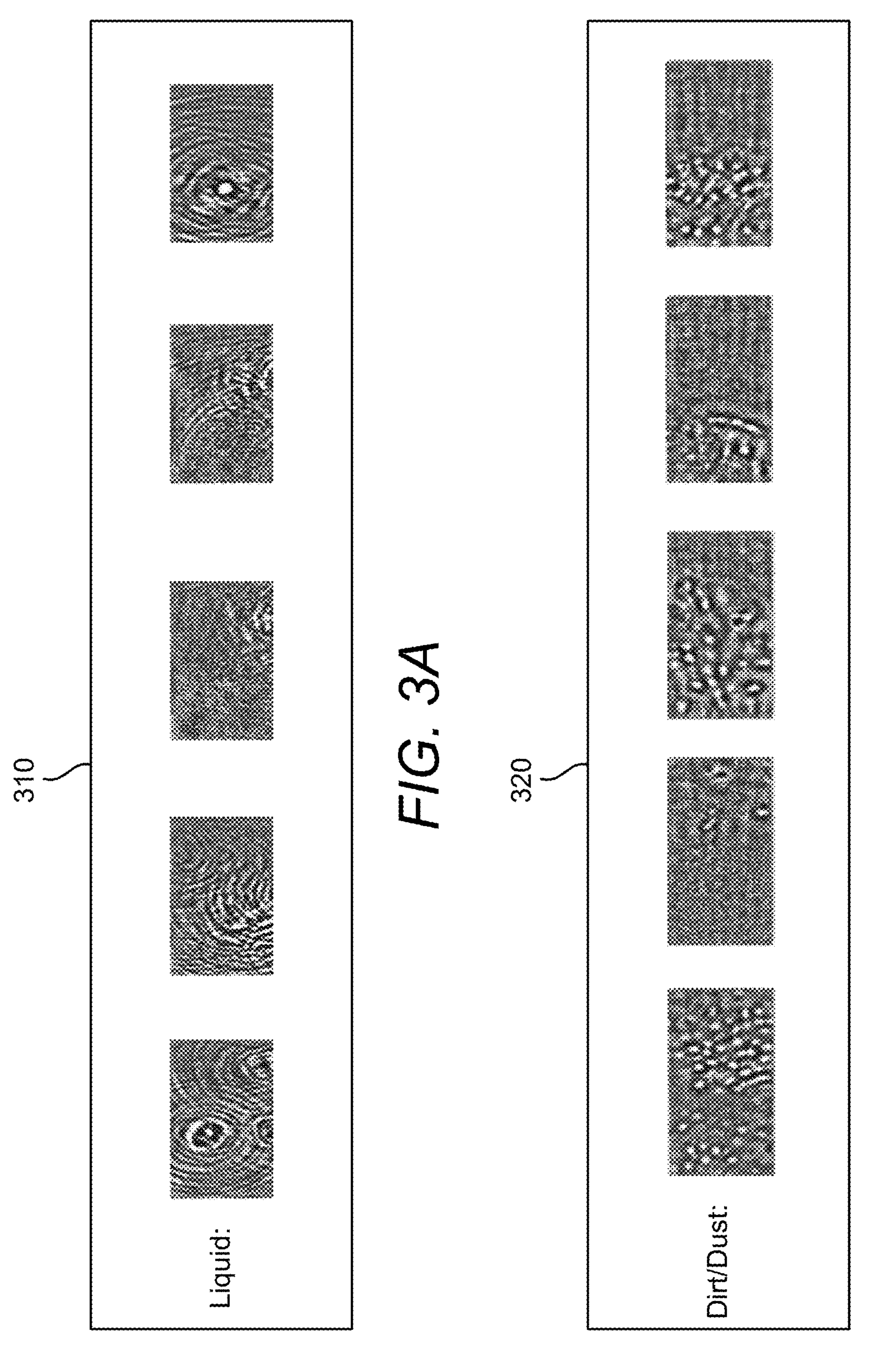
FIGS. 3A and 3B illustrate exemplary images of contaminants on a display according to various aspects of the disclosure.

For example, FIG. 3A shows images 310 of a liquid contaminant on display 234. Images 310 may have been generated by ultrasonic scanner 236 using various frequencies and various range gate delays. For example, different types of materials have different times taken by sound waves reflecting back and the reflection can also vary with different frequencies. Based on the various frequencies used and reflection times the contaminant can be categorize as to the type of contaminant. In another example, FIG. 3B shows images 320 of a solid contaminant such as a dirt/dust contaminant which have been generated by ultrasonic scanner 236. In an aspect, processor 220 may direct ultrasonic scanner 236 to transmit ultrasonic pulses onto display 234 to detect and generate images of possible contaminants on display 234 at certain time intervals. The time intervals can be controlled by processor 220. In an aspect, ultrasonic scanner 236 may use high range gate delay (HRGD) to detect liquid contaminants and may use fingerprint range gate delay (FPRGD), which is a lower range gate delay to detect other types of contaminants. The range gate delay is controlled by programmable delay lines, which may include coarse delay lines and fine delay lines, which can be selectively activated to control the time intervals. Further it will be appreciated that using multiple threshold times based on the expected delays/reflection times various contaminants can be detected and identified.

In an aspect, ultrasonic scanner 236 may transmit the generated images such as images 310 to processor 220 for further processing. Processor 220 may perform further processing to remove noise and blurs to create cleaner images. In some aspects, an image processing algorithm, such as point spread function (PSF) may be used, which is an image processing technique that can be used to combine multiple images in a short time interval to improve the image quality. After processing the images to remove noise and blurs, processor 220 may employ a neural network to identify or classify the contaminant that is on display 234. In some aspects, processor 220 may use a convolutional neural network (CNN) to identify or classify the contaminant. The CNN may have been trained to recognize various liquid contaminants and solid contaminants such as dust and particles. Thus, processor 220 may use the CNN to identify the type of contaminants such as liquid, solid, or other appropriate classifications such as scratches, which may be detected as solid that is persistent and/or may be confirmed by a user of the mobile device. These classifications may be used to further improve the mitigation techniques disclosed herein.

In an aspect, processor 220 may further classify the identified contaminants as either weak contaminants or strong contaminants based on the time that was required to identify the contaminant. For example, if the time needed to identify a contaminant exceeds certain threshold time, the contaminant may be classified or identified as a strong contaminant whereas if the time does not exceed the threshold time, the contaminant may be classified or identified as a weak contaminant. For example, in some aspects a threshold time on the order of 6 milliseconds (ms) can be considered as a threshold time. However, it will be appreciated that the threshold time is dependent on the time required by sound waves to reflect back and for the image to be collected. This can be determined during calibration procedures using known contaminants, as will be appreciated by those skilled in the art. Accordingly, the various aspects are not limited to the specific examples and values provided herein. Further, in some aspects, the identified contaminants can be classified as solid weak, solid strong, liquid weak or liquid strong contaminants, etc. In an aspect, processor 220 may use additional classifications to classify contaminants.

After identifying the contaminant, processor 220 may take a remedial action to mitigate the problems caused by the contaminant. For example, FIG. 4A shows mobile device 400 with rollable display 410. In an aspect, mobile device 400 may be similar to mobile device 200 and display 410 may be similar to display 234. Mobile device 400 may include other components such as processor 220 and camera sensor system 230 similarly to mobile device 200. As shown in FIG. 4A, if processor 220 detects contaminant 415 and identifies contaminant 415 as a solid contaminant, processor 220 may use wiping plane device 420 to remove contaminant 415 from display 410. In other aspects, a blower or combination of blower and wiping may be used to mitigate the contaminant. As a further refinement, the action may differ for weak contamination, e.g., using a blower, wiper, etc. that may be part of the mobile device. However, in some aspects, for strong contaminants, a user may be directly asked to take a specific action to mitigate the contaminant.

Figure 4B:
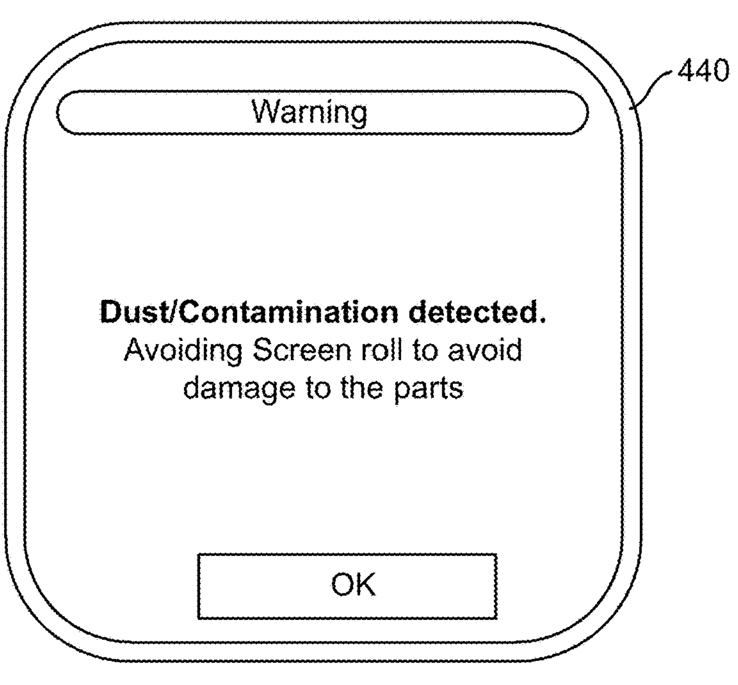

In a further aspect, shown in FIG. 4B, if processor 220 detects contaminant 415 (either liquid or solid), processor 220 may display a user interface (UI) window 440 on display 410. As shown in FIG. 4B, window 440 may show a warning to the user of mobile device 400 such as avoiding a screen roll to protect display 234. The processor 220 may additionally prevent the screen from being rolled up until the user acknowledges that the contamination has been mitigated. For example, by pressing the "OK" soft key, the processor 220 could continue to roll up the display 234. However, in other aspects, the processor 220 may rescan the display 234 to confirm that the contaminant was mitigated, (e.g., no or an acceptable level of contamination is detected). In some aspects, the rescanning may be performed only in the contaminant area, that was identified in the prior scan to reduce power consumption and processing time.

Figure 4C:
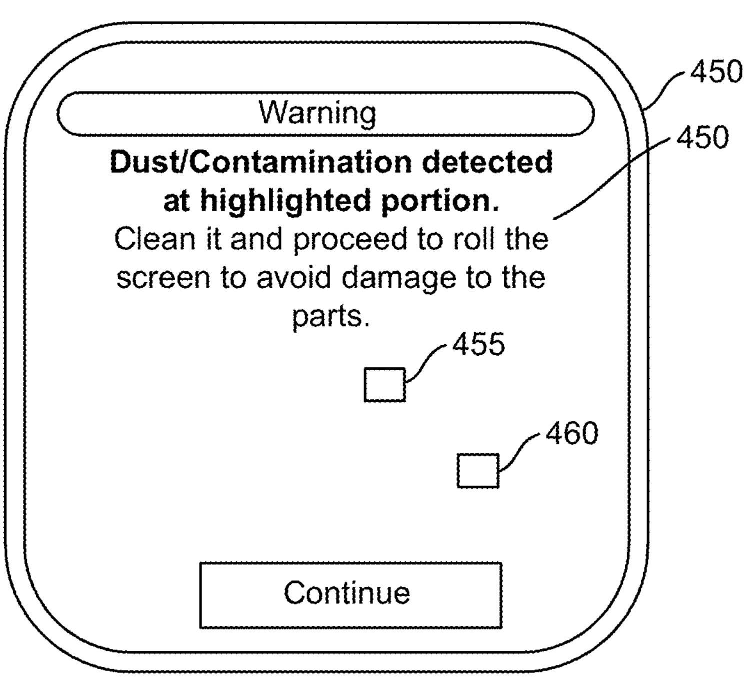

In a further aspect, shown in FIG. 4C, when processor 220 detects a contaminant(s), processor 220 may display UI window 450 that alerts the user of mobile device 400 to clean the contaminant(s) by highlighting the position of the contaminant(s) as shown by highlighted contaminant areas 455 and 460. As shown in FIG. 4C, contaminant areas 455 and 460 identify the location of the contaminants on the display. In some aspects, the one or more contaminant areas (e.g., 455 and 460) may be identified as individual contaminant types using text, color, geometric shapes, etc. The mitigation message may include a warning, contaminant type information, mitigation techniques (e.g., recommended cleaning procedures, cleaning materials, etc.), and/or links to additional information. Further, in some aspects, by pressing the "Continue" soft key, the processor 220 could continue to roll up the display 234. However, in other aspects, the processor 220, after receiving an acknowledgement that the mitigation action is completed (e.g., pressing the "Continue"), may rescan the display 234 in the contaminant area(s) (e.g., 455 and 460) or the whole screen to confirm the contaminant was mitigated. e.g., no or an acceptable level of contamination is detected.

Figure 4D:
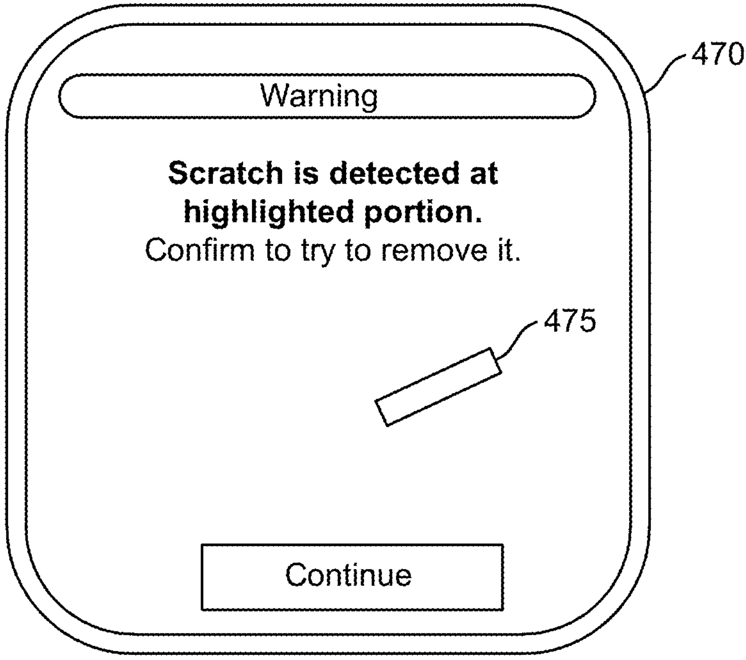

In another example shown in FIG. 4D, if processor 220 detects a scratch such as scratch in contaminant area 475, processor 220 may display UI window 470 that asks the user whether the user wants to remove the scratch. Furthermore, processor 220 may highlight the scratch as shown by highlighting the contaminant area 475. The user may select to remove the scratch. If the user selects to remove the scratch, processor 220 may initiate a procedure that tries to fix and remove the scratch. In some aspects, after identifying the contaminant as a scratch the processor may performing a self-healing process to mitigate the scratch. The self-healing process may include using at least one of heat, light, or electric current to mitigate the scratch. Further, in some aspects, the self-healing process may be limited to the contaminant area 475, which may reduce power consumption and processing time to remove the scratch. Additionally, after the mitigation process is completed (e.g., self-healing process in this example), the processor 220 may rescan the display 234 in the contaminant area 475 or the whole screen to confirm the contaminant was mitigated. e.g., the scratch was removed or reduced an acceptable level. If the rescan results in a further detection of the scratch in contaminant area 475, then the self-healing process can be automatically repeated for a one or more predetermined times, with varying parameters (e.g., longer duration, higher heat, electrical current, etc.) until the contaminant is mitigated. Alternatively, at each rescan the process could await user confirmation to continue.

It will be appreciated that the foregoing illustrative examples, were provided merely to aid in explanation of the various disclosed aspects. For example, different display types may have different mitigation messages/action. In some aspects, for a foldable display a warning may be presented not to fold the display prior to mitigating the contaminant and mitigation techniques may include partially folding and/or positioning the display so that gravity will work remove the contaminant and vibrating the phone to dislodge the contaminant. Accordingly, it will be appreciated that in accordance with the various aspects disclosed herein, processor 220 may take other actions to mitigate the contaminants detected and identified, and the various aspects disclosed are not limited to the illustrated components and actions illustrated in FIGS. 4A-4D.

The components of FIG. 2 may be implemented in various ways. In some implementations, the components of FIG. 2 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 210 to 240 may be implemented by processor and memory component(s) of the mobile device 200 (e.g., by execution of appropriate code and/or by appropriate configuration of processor components). However, as will be appreciated, such operations, acts, and/or functions may actually be performed by specific components or combinations of components of mobile device 200, such as antenna array 210, transceiver 222, processor 220, camera sensor system 230, display 234 and memory 240.

Figure 5A:
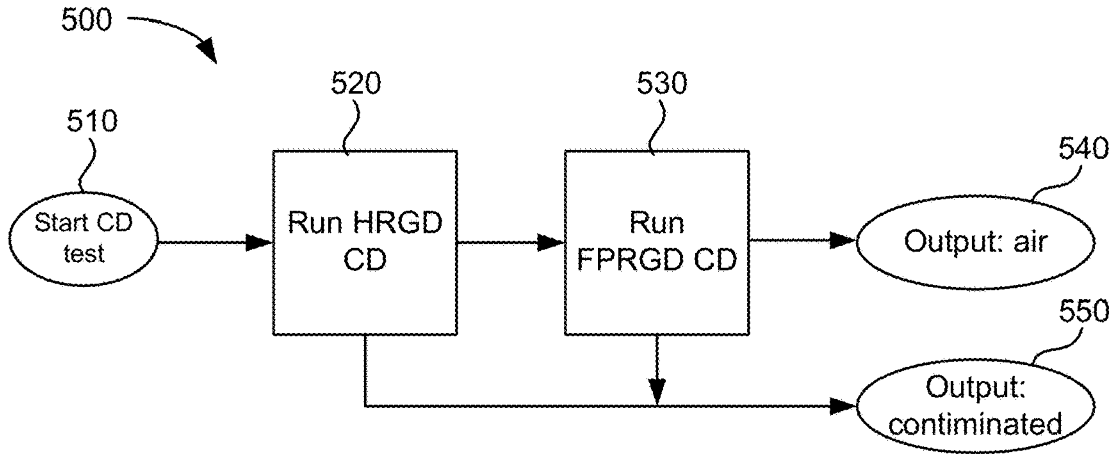
FIGS. 5A-5C illustrate block diagrams of contaminant detection (CD) processes in accordance with one or more aspects of the disclosure.
Figure 5B:
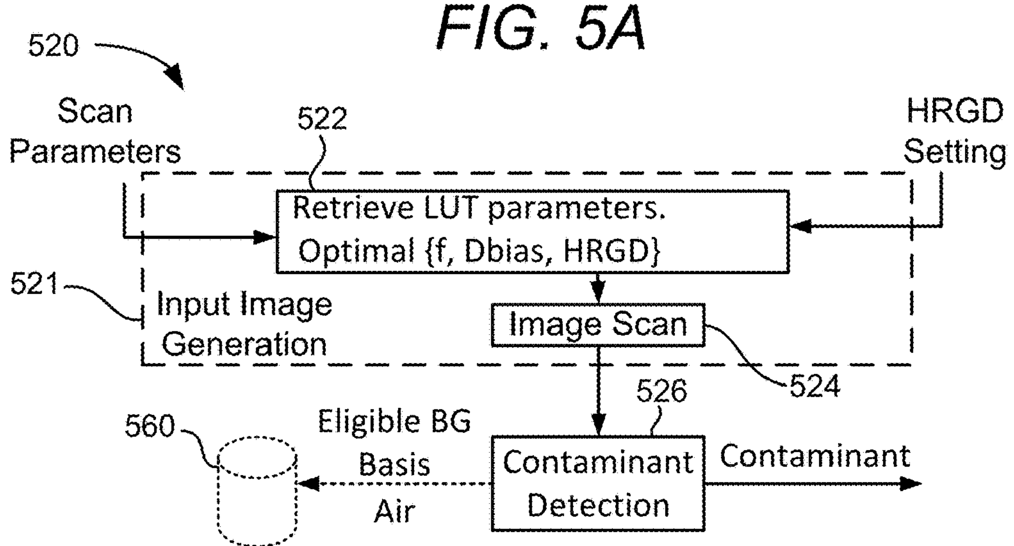
Figure 5C:
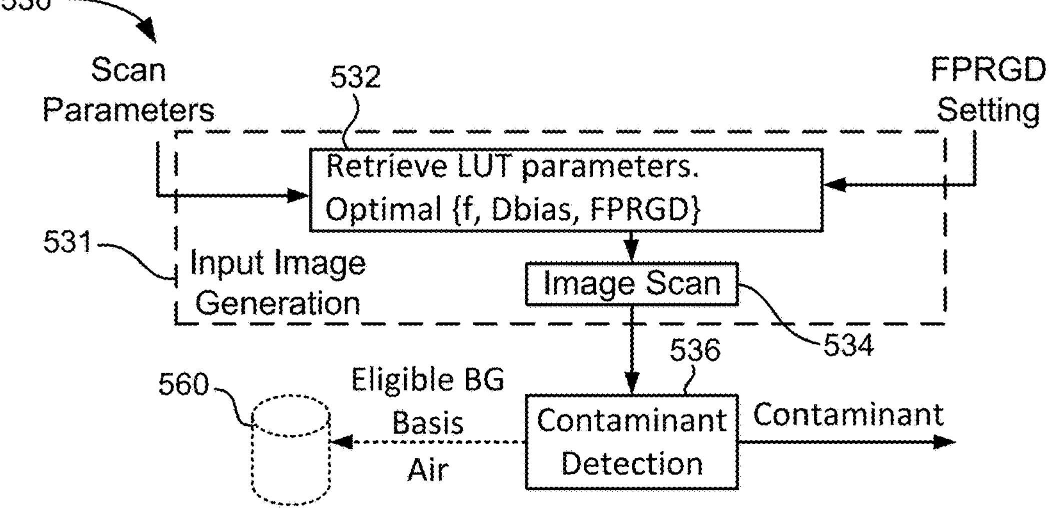

FIGS. 5A-5C illustrate block diagrams of one or more contaminant detection (CD) processes 500 in accordance with one or more aspects of the disclosure. Referring to FIG. 5A the CD process 500 can start at module 510. The process 500 may be initiated by a call to start module 510 from an upper layer application (e.g., such as applications that relay on screen clarity and/or screen image capture), at predetermined intervals, in response to environmental/context changes to the mobile device (e.g., temperature change, extended idle period, change in ambient light, etc.), may be triggered as part of other operations, such as conventional fingerprint background imaging and CD detection, upon a display rollup command. At module 520, the HRGD CD process is performed to detect liquid contaminants as discussed herein. At module 530, the FPRGD CD process is performed to detect solid contaminants, as discussed herein. In each case, for the HRGD CD at module 520 and the FPRGD at module 530, if a contaminant is not detected, then the output 540 is assumed to be only air detect or no contaminant detected. Likewise, in each case, for the HRGD CD at module 520 and the FPRGD CD at module 530, if a contaminant is detected, then the output 550 indicates a contaminant is detected. It will be appreciated that this is a simplified block diagram provided merely for a high-level explanation and is not to be construed as limiting the various aspects disclosed herein. For example, it is not required that both the HRGD CD and the FPRGD CD be run in each instant. Further, additional screening can take place, such as an Electromagnetic interference (EMI) check can be performed to ensure that the images are not subject to and/or compromised by high frequency noise. Additional details will be provided related to the HRGD CD and FPRGD CD in the following.

Referring to FIG. 5B a block diagram of the HRGD CD process of module 520 is illustrated, in accordance with one or more aspects of the disclosure. For example, dashed module 521 relates to the input image generation. Module 522 may include scan parameters such as frequency (f), DC voltage bias (Dbias), and the FPRGD setting to set the various programmable delay lines, which provide for the appropriate scanning for the objects of interest (e.g., liquids) at given environmental conditions, such as temperature (e.g., generally the HRGD will be greater for lower temperatures and less for higher temperatures). These parameters to configure the ultrasonic scanner (e.g., 236) may be obtained from a lookup table (LUT) and/or dynamically configured. At module 524, one or more images are acquired using the ultrasonic scanner configured with the parameters for the HRGD CD. These image(s) are then passed to the module 526 where the contamination detection is performed. If a contaminant is detected, the output indication will be contaminated and, in some aspects, the output can include a ranking that will allow for a further classification of being a weak contaminant or strong contaminant. If a contaminant is not detected, then optionally the images detected may be eligible for being used as background (BG) images and may be stored in memory/database 560 so they may be used in fingerprint detection and/or other image processing that may use background images for image processing (e.g., subtractive functions to remove the background).

Referring to FIG. 5C a block diagram of the FPRGD CD process of module 530 is illustrated, in accordance with one or more aspects of the disclosure. For example, dashed module 531 relates to the input image generation. Module 532 may include scan parameters such as frequency (0, DC voltage bias (Dbias), and the HRGD setting to set the various programmable delay lines, which provide for the appropriate scanning for the objects of interest (e.g., solids) at given environmental conditions, such as temperature. These parameters to configure the ultrasonic scanner (e.g., 236) may be obtained from a lookup table (LUT) and/or dynamically configured. At module 534 one or more images are acquired using the ultrasonic scanner configured with the parameters for the FPRGD CD. These image(s) are then passed to the module 536 where the contamination detection is performed. If a contaminant is detected, the output indication will be contaminated, the output can include a ranking that will allow for a further classification of being a weak contaminant or strong contaminant. If a contaminant is not detected, then optionally the images detected may be eligible for background (BG) image and may be stored in memory/database 560 so they may be used in fingerprint detection and/or other image processing that may use background imaging, as noted above.

It will be appreciated that contamination detection modules (e.g., modules 526 and 536) may include multiple elements. For example, in some aspects, at a high level, contaminant detection is performed in two functions/processes/elements, 1. Image pre-processing and 2. Convolutional neural network (CNN) classifier. In some aspects, the CNN outputs a contamination score on the range of 0.0 to 1.0, where lower numbers (below a determined threshold) indicate air or no contamination and the strength of the contamination increases as the contamination score increases. It will be appreciated the output range and relative grading can be normalized and set to various ranges and inverted, e.g., 0 to 10 and higher numbers indicating no contamination. Accordingly, these examples should not be construed to limit the various aspects disclosed. It will be appreciated that the CNN classifier is trained from a large sampling of screen images of known contaminants and not contaminated screens, as is known in the art. Additionally, it will be appreciated that the image preprocessing, may include various functions/processes/elements. For example, in some aspects, the image preprocessing may include frame removal (e.g., using standard functions from an Image Processing Pipeline (IPP) library, high pass filter (to remove background gradients from images), auto scale use gain and offset calculated from the IPP library. It will be appreciated that the foregoing examples are provided for illustration and not limitation of the various aspects disclosed. For example, it will be appreciated that the CNN classifier in module 526 and CNN classifier in module 536 would be different at least in that the training of the CNN classifiers would be directed to contaminants each is being used to detect (e.g., liquid, and solid, respectively). Further, the CNN modules, in some aspects, can be further trained to identify different types of contaminants, such as liquid, water, liquid, oil, along with the strength of each of these. Accordingly, the various aspects disclosed are not limited to the explicit examples provided.

Figure 6:
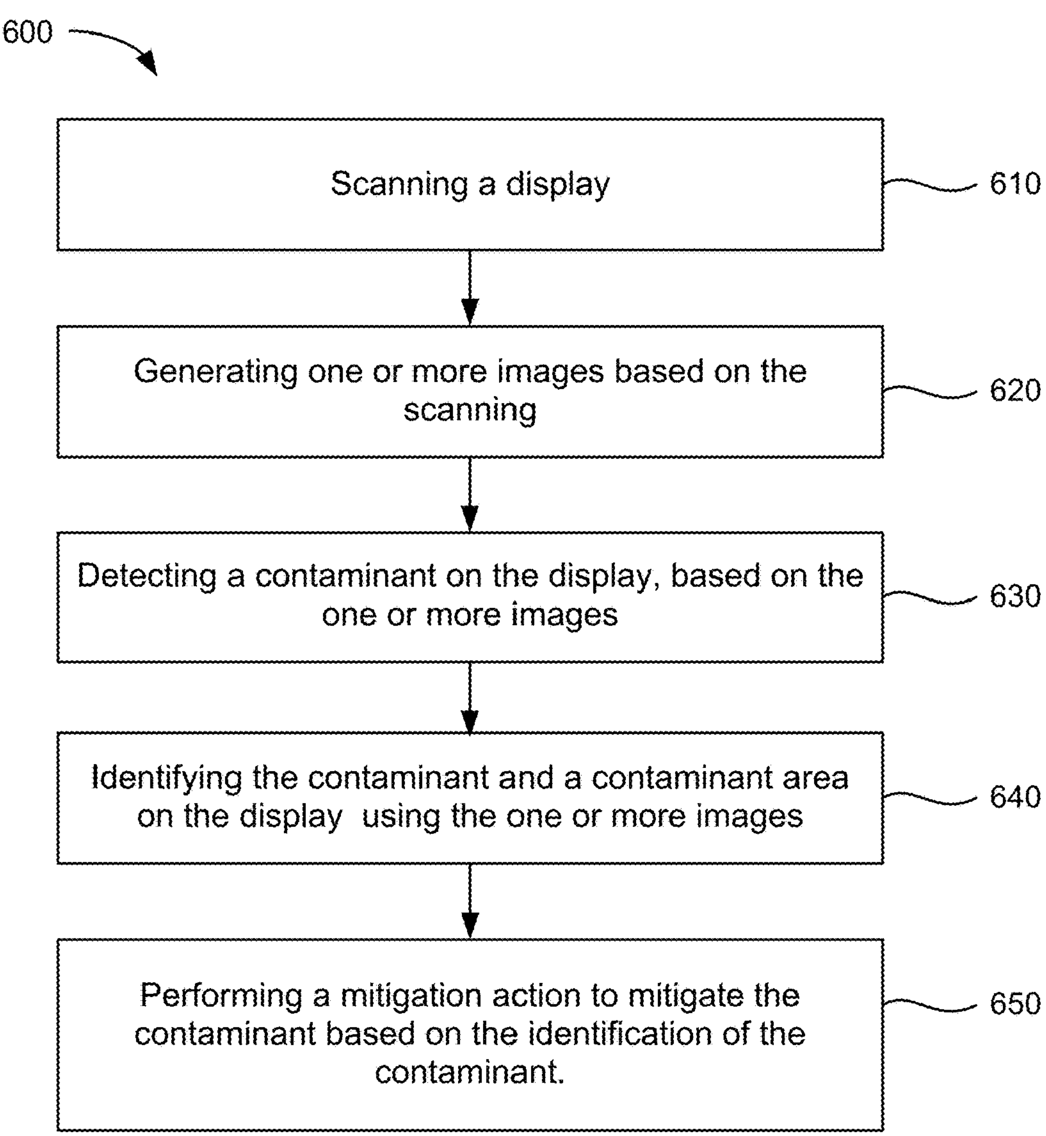
FIG. 6 illustrates a flowchart corresponding to one or more methods of detecting contaminants according to various aspects of the disclosure.

It will be appreciated that aspects include various methods for performing the processes, functions and/or algorithms disclosed herein. For example, FIG. 6 shows a method 600 for detecting a contaminant on a display and taking an action to remediate or mitigate the contaminant. The method may be performed by a device such as mobile device 200, processor 220, UEs 104, 190 or other UEs shown in FIG. 1, or any other suitable device (e.g., monitors, televisions, etc.) which may include a display with the functionalities disclosed herein. To facilitate illustration of the various aspects, in an example configuration, the method 600 of mitigating a contaminant on a display described in FIG. 6 may be related to being performed by mobile device as discussed herein.

At block 610, the method scans a display. For example, in some aspects as described herein, the scanning can be performed by using ultrasonic pulses. In some aspects, ultrasonic scanner 236 may scan display 234 by transmitting and receiving ultrasonic pulses.

At block 620, the method generates images of the contaminant based on the images. For example, in some aspects, the ultrasonic scanner 236 may generate one or more images of the contaminant (e.g., images 310 and 320).

At block 630, the method detects the contaminant on the display based on the one or more images At block 640, the method identifies the contaminant and a contaminant area on the display using the one or more images. For example, in some aspects, the processor 220 may use a neural network to identify the contaminants based on the generated images.

At block 650, the method performs a mitigation action to mitigate the contaminant based on the identification of the contaminant. For example, in some aspects, the processor 220 may take various actions to mitigate the contaminant such as displaying a UI window warning the user, wiping dust off the display, performing a self-healing process to remove scratches, etc.

It will be appreciated from the foregoing that the various aspects disclosed may include additional and/or alternative methods, processes and/or actions. For example, the scanning the display using ultrasonic pulse may include changing a frequency of the ultrasonic pulses and/or changing a range gate delay of the ultrasonic pulses to generate the images. In some aspects, the scanning may be performed by an ultrasonic full screen fingerprint sensor.

In some aspects, performing the mitigation action may include performing one or more actions. For example, the mitigation action may include displaying a user interface (UI) window including a mitigation message (see, e.g., FIGS. 4A-4D). Further, the mitigation message may include text identifying the contaminant and/or the mitigation message may include instructions to mitigate the contaminant. The various methods may further include highlighting the contaminant area (e.g., 455, 460, 470) on the display.

In some aspects, the various methods disclosed may include receiving an acknowledgement that the mitigation action is completed; and rescanning the display in the contaminant area to confirm the contaminant was mitigated. The acknowledgement may further include receiving an input from a user indicating that mitigation action is completed. In further aspects, the acknowledgement may include receiving a completion indication from an automated mitigation action (e.g., self-healing, wiping, etc.). For example, in some aspects, the mitigation action may further include identifying the contaminant as a scratch performing a self-healing process to mitigate the scratch. The self-healing process, in some aspects, includes using at least one of heat, light, or electric current to mitigate the scratch. In further aspects, the self-healing process may be limited to the contaminant area. It will be appreciated that the self-healing process may be used on rollable displays, foldable displays, and fixed displays.

In some aspects, the mitigation aspect may depend on the display type. For example, if the display is a rollable display, the mitigation action may further include preventing the display from being rolled up. This may trigger an automated cleaning process and/or may be used in combination with one or more UI messages to the user and request manual cleaning. In some aspects, the user may be allowed to override the blocking of the rollup by selecting a designated user input. In some aspects, the mitigation action to mitigate may be limited to the contaminant area. For example, only a portion of the screen may be cleaned that contains the contaminant area.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of mitigating a contaminant on a display, the method comprising: scanning the display; generating one or more images related to the contaminant based on the scanning; detecting the contaminant on the display based on the one or more images; identifying the contaminant on the display using the one or more images; and performing a mitigation action to mitigate the contaminant based on the identification of the contaminant.

Clause 2. The method of clause 1, wherein scanning the display further comprises: using an ultrasonic scanner to scan the display.

Clause 3. The method of clause 2, further comprising: changing a frequency of ultrasonic pulses used by the ultrasonic scanner to generate the one or more images.

Clause 4. The method of any of clauses 2 to 3, further comprising: changing a range gate delay of the ultrasonic scanner to generate the images.

Clause 5. The method of any of clauses 2 to 4, wherein the ultrasonic scanner is an ultrasonic full screen fingerprint sensor.

Clause 6. The method of any of clauses 1 to 5, wherein performing the mitigation action comprises: displaying a user interface (UI) window including a mitigation message.

Clause 7. The method of clause 6, wherein the mitigation message includes text identifying the contaminant.

Clause 8. The method of any of clauses 6 to 7, wherein the mitigation message includes instructions to mitigate the contaminant.

Clause 9. The method of any of clauses 6 to 8, further comprising: highlighting a contaminant area on the display, wherein the contaminant area contains the contaminant.

Clause 10. The method of any of clauses 1 to 9, further comprising: receiving an acknowledgement that the mitigation action is completed; and rescanning the display in a contaminant area to confirm the contaminant was mitigated.

Clause 11. The method of clause 10, wherein receiving the acknowledgement further comprises: receiving an input from a user indicating that the mitigation action is completed.

Clause 12. The method of any of clauses 10 to 11, wherein receiving the acknowledgement further comprises: receiving a completion indication from an automated mitigation action.

Clause 13. The method of any of clauses 1 to 12, wherein performing the mitigation action further comprises: identifying the contaminant as a scratch; and performing a self-healing process to mitigate the scratch.

Clause 14. The method of clause 13, wherein the self-healing process includes using at least one of heat, light, or electric current to mitigate the scratch.

Clause 15. The method of clause 14, wherein the self-healing process is limited to a contaminant area.

Clause 16. The method of any of clauses 1 to 15, wherein the display is a rollable display and performing the mitigation action further comprises: preventing the display from being rolled up.

Clause 17. The method of any of clauses 1 to 16, wherein the mitigation action to mitigate is limited to a contaminant area that includes the contaminant.

Clause 18. The method of any of clauses 1 to 17, wherein identifying the contaminant includes identifying the contaminant as a solid, a liquid or a scratch.

Clause 19. The method of clause 18, wherein identifying the contaminant further comprises: using a neural network trained to identify contaminants.

Clause 20. The method of any of clauses 18 to 19, wherein identifying the contaminant further comprises: identifying the contaminant as weak or strong based on a time to identify the contaminant.

Clause 21. A mobile device, comprising: an ultrasonic scanner; a memory; and at least one processor communicatively coupled to the memory and ultrasonic scanner and configured to mitigate a contaminant on a display, the at least one processor, memory and ultrasonic scanner cooperatively configured to: scan the display; generate one or more images related to the contaminant based on the scan; detect the contaminant on the display based on the one or more images; identify the contaminant on the display using the one or more images; and perform a mitigation action to mitigate the contaminant based on the identification of the contaminant.

Clause 22. The mobile device of clause 21, wherein the at least one processor configured to scan the display comprises the at least one processor configured to: use the ultrasonic scanner to scan the display.

Clause 23. The mobile device of clause 22, wherein the at least one processor is further configured to: change a frequency of ultrasonic pulses used by the ultrasonic scanner to generate the one or more images.

Clause 24. The mobile device of any of clauses 22 to 23, wherein the at least one processor is further configured to: change a range gate delay of the ultrasonic scanner to generate the images.

Clause 25. The mobile device of any of clauses 22 to 24, wherein the ultrasonic scanner is an ultrasonic full screen fingerprint sensor.

Clause 26. The mobile device of any of clauses 21 to 25, wherein the at least one processor configured to perform the mitigation action comprises the at least one processor configured to: display a user interface (UI) window including a mitigation message.

Clause 27. The mobile device of clause 26, wherein the mitigation message includes text identifying the contaminant.

Clause 28. The mobile device of any of clauses 26 to 27, wherein the mitigation message includes instructions to mitigate the contaminant.

Clause 29. The mobile device of any of clauses 26 to 28, wherein the at least one processor is further configured to: highlight a contaminant area on the display, wherein the contaminant area contains the contaminant.

Clause 30. The mobile device of any of clauses 21 to 29, wherein the at least one processor is further configured to: receive an acknowledgement that the mitigation action is completed; and rescan the display in a contaminant area to confirm the contaminant was mitigated.

Clause 31. The mobile device of clause 30, wherein the at least one processor configured to receive the acknowledgement comprises the at least one processor configured to: receive an input from a user indicating that the mitigation action is completed.

Clause 32. The mobile device of any of clauses 30 to 31, wherein the at least one processor configured to receive the acknowledgement comprises the at least one processor configured to: receive a completion indication from an automated mitigation action.

Clause 33. The mobile device of any of clauses 21 to 32, wherein the at least one processor configured to perform the mitigation action comprises the at least one processor configured to: identify the contaminant as a scratch; and perform a self-healing process to mitigate the scratch.

Clause 34. The mobile device of clause 33, wherein the self-healing process includes using at least one of heat, light, or electric current to mitigate the scratch.

Clause 35. The mobile device of clause 34, wherein the self-healing process is limited to a contaminant area.

Clause 36. The mobile device of any of clauses 21 to 35, wherein the display is a rollable display and performing the mitigation action further comprises: prevent the display from being rolled up.

Clause 37. The mobile device of any of clauses 21 to 36, wherein the mitigation action to mitigate is limited to a contaminant area that includes the contaminant.

Clause 38. The mobile device of any of clauses 21 to 37, wherein the at least one processor configured to identify the contaminant comprises the at least one processor configured to identify the contaminant as a solid, a liquid or a scratch.

Clause 39. The mobile device of clause 38, wherein the at least one processor configured to identify the contaminant comprises the at least one processor configured to: use a neural network trained to identify contaminants.

Clause 40. The mobile device of any of clauses 38 to 39, wherein the at least one processor configured to identify the contaminant comprises the at least one processor configured to: identify the contaminant as weak or strong based on a time to identify the contaminant.

Clause 41. A mobile device configured to mitigate a contaminant on a display, comprising: means for scanning the display; means for generating one or more images related to the contaminant based on the scanning; means for detecting the contaminant on the display based on the one or more images; means for identifying the contaminant on the display using the one or more images; and means for performing a mitigation action to mitigate the contaminant based on the identification of the contaminant.

Clause 42. The mobile device of clause 41, wherein the means for scanning the display further comprises an ultrasonic scanner.

Clause 43. The mobile device of clause 42, further comprising: means for changing a frequency of ultrasonic pulses used by the ultrasonic scanner to generate the one or more images.

Clause 44. The mobile device of any of clauses 42 to 43, further comprising: means for changing a range gate delay of the ultrasonic scanner to generate the images.

Clause 45. The mobile device of any of clauses 42 to 44, wherein the ultrasonic scanner is an ultrasonic full screen fingerprint sensor.

Clause 46. The mobile device of any of clauses 41 to 45, wherein the means for performing the mitigation action comprises: means for displaying a user interface (UI) window including a mitigation message.

Clause 47. The mobile device of clause 46, wherein the mitigation message includes text identifying the contaminant.

Clause 48. The mobile device of any of clauses 46 to 47, wherein the mitigation message includes instructions to mitigate the contaminant.

Clause 49. The mobile device of any of clauses 46 to 48, further comprising: means for highlighting a contaminant area on the display, wherein the contaminant area contains the contaminant.

Clause 50. The mobile device of any of clauses 41 to 49, further comprising: means for receiving an acknowledgement that the mitigation action is completed; and means for rescanning the display in a contaminant area to confirm the contaminant was mitigated.

Clause 51. The mobile device of clause 50, wherein the means for receiving the acknowledgement further comprises: means for receiving an input from a user indicating that the mitigation action is completed.

Clause 52. The mobile device of any of clauses 50 to 51, wherein the means for receiving the acknowledgement further comprises: means for receiving a completion indication from an automated mitigation action.

Clause 53. The mobile device of any of clauses 41 to 52, wherein the means for performing the mitigation action further comprises: means for identifying the contaminant as a scratch; and means for performing a self-healing process to mitigate the scratch.

Clause 54. The mobile device of clause 53, wherein the self-healing process includes using at least one of heat, light, or electric current to mitigate the scratch.

Clause 55. The mobile device of clause 54, wherein the self-healing process is limited to a contaminant area.

Clause 56. The mobile device of any of clauses 41 to 55, wherein the display is a rollable display and performing the mitigation action further comprises: means for preventing the display from being rolled up.

Clause 57. The mobile device of any of clauses 41 to 56, wherein the mitigation action to mitigate is limited to a contaminant area that includes the contaminant.

Clause 58. The mobile device of any of clauses 41 to 57, wherein the means for identifying the contaminant includes means for identifying the contaminant as a solid, a liquid or a scratch.

Clause 59. The mobile device of clause 58, wherein the means for identifying the contaminant further comprises: means for using a neural network trained to identify contaminants.

Clause 60. The mobile device of any of clauses 58 to 59, wherein the means for identifying the contaminant further comprises: means for identifying the contaminant as weak or strong based on a time to identify the contaminant.

Clause 61. A non-transitory computer-readable medium storing computer-executable instructions configured to mitigate a contaminant on a display that, when executed by a mobile device, cause the mobile device to: scan the display; generate one or more images related to the contaminant based on the scanning; detect the contaminant on the display based on the one or more images; identify the contaminant on the display using the one or more images; and perform a mitigation action to mitigate the contaminant based on the identification of the contaminant.

Clause 62. The non-transitory computer-readable medium of clause 61, wherein the computer-executable instructions that, when executed by the mobile device, cause the mobile device to scan the display comprise computer-executable instructions that, when executed by the mobile device, cause the mobile device to: use an ultrasonic scanner to scan the display.

Clause 63. The non-transitory computer-readable medium of clause 62, further comprising computer-executable instructions that, when executed by the mobile device, cause the mobile device to: change a frequency of ultrasonic pulses used by the ultrasonic scanner to generate the one or more images.

Clause 64. The non-transitory computer-readable medium of any of clauses 62 to 63, further comprising computer-executable instructions that, when executed by the mobile device, cause the mobile device to: change a range gate delay of the ultrasonic scanner to generate the images.

Clause 65. The non-transitory computer-readable medium of any of clauses 62 to 64, wherein the ultrasonic scanner is an ultrasonic full screen fingerprint sensor.

Clause 66. The non-transitory computer-readable medium of any of clauses 61 to 65, wherein the computer-executable instructions that, when executed by the mobile device, cause the mobile device to perform the mitigation action comprise computer-executable instructions that, when executed by the mobile device, cause the mobile device to: display a user interface (UI) window including a mitigation message.

Clause 67. The non-transitory computer-readable medium of clause 66, wherein the mitigation message includes text identifying the contaminant.

Clause 68. The non-transitory computer-readable medium of any of clauses 66 to 67, wherein the mitigation message includes instructions to mitigate the contaminant.

Clause 69. The non-transitory computer-readable medium of any of clauses 66 to 68, further comprising computer-executable instructions that, when executed by the mobile device, cause the mobile device to: highlight a contaminant area on the display, wherein the contaminant area contains the contaminant.

Clause 70. The non-transitory computer-readable medium of any of clauses 61 to 69, further comprising computer-executable instructions that, when executed by the mobile device, cause the mobile device to: receive an acknowledgement that the mitigation action is completed; and rescan the display in a contaminant area to confirm the contaminant was mitigated.

Clause 71. The non-transitory computer-readable medium of clause 70, wherein the computer-executable instructions that, when executed by the mobile device, cause the mobile device to receive the acknowledgement comprise computer-executable instructions that, when executed by the mobile device, cause the mobile device to: receive an input from a user indicating that the mitigation action is completed.

Clause 72. The non-transitory computer-readable medium of any of clauses 70 to 71, wherein the computer-executable instructions that, when executed by the mobile device, cause the mobile device to receive the acknowledgement comprise computer-executable instructions that, when executed by the mobile device, cause the mobile device to: receive a completion indication from an automated mitigation action.

Clause 73. The non-transitory computer-readable medium of any of clauses 61 to 72, wherein the computer-executable instructions that, when executed by the mobile device, cause the mobile device to perform the mitigation action comprise computer-executable instructions that, when executed by the mobile device, cause the mobile device to: identify the contaminant as a scratch; and perform a self-healing process to mitigate the scratch.

Clause 74. The non-transitory computer-readable medium of clause 73, wherein the self-healing process includes using at least one of heat, light, or electric current to mitigate the scratch.

Clause 75. The non-transitory computer-readable medium of clause 74, wherein the self-healing process is limited to a contaminant area.

Clause 76. The non-transitory computer-readable medium of any of clauses 61 to 75, wherein the display is a rollable display and performing the mitigation action further comprises: prevent the display from being rolled up.

Clause 77. The non-transitory computer-readable medium of any of clauses 61 to 76, wherein the mitigation action to mitigate is limited to a contaminant area that includes the contaminant.

Clause 78. The non-transitory computer-readable medium of any of clauses 61 to 77, wherein the computer-executable instructions that, when executed by the mobile device, cause the mobile device to identify the contaminant comprise computer-executable instructions that, when executed by the mobile device, cause the mobile device to identify the contaminant as a solid, a liquid or a scratch.

Clause 79. The non-transitory computer-readable medium of clause 78, wherein the computer-executable instructions that, when executed by the mobile device, cause the mobile device to identify the contaminant comprise computer-executable instructions that, when executed by the mobile device, cause the mobile device to: use a neural network trained to identify contaminants.

Clause 80. The non-transitory computer-readable medium of any of clauses 78 to 79, wherein the computer-executable instructions that, when executed by the mobile device, cause the mobile device to identify the contaminant comprise computer-executable instructions that, when executed by the mobile device, cause the mobile device to: identify the contaminant as weak or strong based on a time to identify the contaminant.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of mitigating a contaminant on a display of a mobile device, the method comprising:
- scanning the display using a scanner in the mobile device;
- generating one or more images of the contaminant based on the scanning;
- detecting the contaminant on the display based on the one or more images;
- identifying a type of the contaminant on the display using the one or more images; and
- performing a mitigation action to mitigate the contaminant based on the identification of the type of the contaminant including highlighting a contaminant area on the display, wherein the contaminant area contains the contaminant.

2. The method of claim 1, wherein the scanner is an ultrasonic scanner.

3. The method of claim 2, further comprising:
- changing a frequency of ultrasonic pulses used by the ultrasonic scanner to generate the one or more images.

4. The method of claim 2, further comprising:
- changing a range gate delay of the ultrasonic scanner to generate the images.

5. The method of claim 2, wherein the ultrasonic scanner is an ultrasonic full screen fingerprint sensor.

6. The method of claim 1, wherein performing the mitigation action comprises:
- displaying a user interface (UI) window including a mitigation message.

7. The method of claim 6, wherein the mitigation message includes text identifying the contaminant.

8. The method of claim 6, wherein the mitigation message includes instructions to mitigate the contaminant.

9. The method of claim 1, further comprising:
- receiving an acknowledgement that the mitigation action is completed; and
- rescanning the display in a contaminant area to confirm the contaminant was mitigated.

10. The method of claim 9, wherein receiving the acknowledgement further comprises:
- receiving an input from a user indicating that the mitigation action is completed.

11. The method of claim 9, wherein receiving the acknowledgement further comprises:
- receiving a completion indication from an automated mitigation action.

12. The method of claim 1, wherein performing the mitigation action further comprises:
- identifying the contaminant as a scratch; and
- performing a self-healing process to mitigate the scratch.

13. The method of claim 12, wherein the self-healing process includes using at least one of heat, light, or electric current to mitigate the scratch.

14. The method of claim 13, wherein the self-healing process is limited to a contaminant area.

15. The method of claim 1, wherein the display is a rollable display and performing the mitigation action further comprises:
- preventing the display from being rolled up.

16. The method of claim 1, wherein the mitigation action to mitigate is limited to a contaminant area that includes the contaminant.

17. The method of claim 1, wherein identifying the contaminant includes identifying the contaminant as a solid, a liquid or a scratch.

18. The method of claim 17, wherein identifying the contaminant further comprises:
- using a neural network trained to identify contaminants.

19. The method of claim 17, wherein identifying the contaminant further comprises:
- identifying the contaminant as weak or strong based on a time to identify the contaminant.

20. A mobile device, comprising:
- an ultrasonic scanner;
- a memory; and
- at least one processor communicatively coupled to the memory and ultrasonic scanner and configured to mitigate a contaminant on a display of the mobile device, the at least one processor, memory and ultrasonic scanner cooperatively configured to:
  - scan the display;

generate one or more images of the contaminant based on the scan;

detect the contaminant on the display based on the one or more images;

identify a type of the contaminant on the display using the one or more images; and perform a mitigation action to mitigate the contaminant based on the identification of the type of the contaminant including highlighting a contaminant area on the display, wherein the contaminant area contains the contaminant.

21. The mobile device of claim 20, wherein the at least one processor configured to scan the display comprises the at least one processor configured to:

use the ultrasonic scanner to scan the display.

22. The mobile device of claim 21, wherein the ultrasonic scanner is an ultrasonic full screen fingerprint sensor.

23. The mobile device of claim 20, wherein the at least one processor is further configured to:

receive an acknowledgement that the mitigation action is completed; and rescan the display in a contaminant area to confirm the contaminant was mitigated.

24. A mobile device configured to mitigate a contaminant on a display of the mobile device, comprising:

means for scanning the display;

means for generating one or more images of the contaminant based on the scanning;

means for detecting the contaminant on the display based on the one or more images;

means for identifying a type of the contaminant on the display using the one or more images; and means for performing a mitigation action to mitigate the contaminant based on the identification of the type of the contaminant wherein the mitigation action includes highlighting a contaminant area on the display and the contaminant area contains the contaminant.

25. The mobile device of claim 24, wherein the means for scanning the display further comprises an ultrasonic scanner.

26. The mobile device of claim 25, wherein the ultrasonic scanner is an ultrasonic full screen fingerprint sensor.

27. A non-transitory computer-readable medium storing computer-executable instructions configured to mitigate a contaminant on a display of a mobile device that, when executed by the mobile device, cause the mobile device to:

scan the display;

generate one or more images of the contaminant based on the scanning;

detect the contaminant on the display based on the one or more images;

identify a type of the contaminant on the display using the one or more images; and perform a mitigation action to mitigate the contaminant based on the identification of the type of the contaminant including highlighting a contaminant area on the display, wherein the contaminant area contains the contaminant.

28. The non-transitory computer-readable medium of claim 27, wherein the computer-executable instructions that, when executed by the mobile device, cause the mobile device to scan the display comprise computer-executable instructions that, when executed by the mobile device, cause the mobile device to:

use an ultrasonic scanner to scan the display.

29. The non-transitory computer-readable medium of claim 28, wherein the ultrasonic scanner is an ultrasonic full screen fingerprint sensor.

* * * * *